United States Patent
Dantressangle et al.

(10) Patent No.: US 10,585,893 B2
(45) Date of Patent: Mar. 10, 2020

(54) DATA PROCESSING

(71) Applicant: International Business Machines Corporation, Armonk, NY (US)

(72) Inventors: Patrick Dantressangle, Winchester (GB); Simon Laws, Winchester (GB); Stacey H. Ronaghan, Winchester (GB); Peter Wooldridge, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 710 days.

(21) Appl. No.: 15/084,616

(22) Filed: Mar. 30, 2016

(65) Prior Publication Data

US 2017/0286489 A1    Oct. 5, 2017

(51) Int. Cl.
*G06F 16/2455* (2019.01)
*G06F 16/22* (2019.01)

(52) U.S. Cl.
CPC .......... *G06F 16/2455* (2019.01); *G06F 16/22* (2019.01)

(58) Field of Classification Search
CPC ......... G06F 17/30312; G06F 17/30598; G06F 17/30604; G06F 16/22; G06F 16/2272; G06F 16/288; G06F 16/2455; G06F 16/285
USPC ................................................. 707/737, 770
See application file for complete search history.

(56) References Cited

U.S. PATENT DOCUMENTS

| | | | |
|---|---|---|---|
| 7,386,545 B2 * | 6/2008 | Ashutosh | G06F 16/35 |
| 7,672,833 B2 | 3/2010 | Blume et al. | |
| 8,229,883 B2 | 7/2012 | Brauer et al. | |
| 8,799,282 B2 | 8/2014 | Goldenberg et al. | |
| 2011/0106807 A1 | 5/2011 | Srihari et al. | |
| 2013/0325882 A1 | 12/2013 | Deshpande et al. | |
| 2015/0039611 A1 | 2/2015 | Deshpande et al. | |

(Continued)

FOREIGN PATENT DOCUMENTS

CN    104182420    12/2014

OTHER PUBLICATIONS

International Search Report, PCT/IB2017/051818, dated Jul. 12, 2017, 11 pages.
Aug. 22, 2017—Mailing Date of Notification Concerning the Filing of Amendments of the Claims, 1 Page.

(Continued)

*Primary Examiner* — Alford W Kindred
*Assistant Examiner* — Cecile H Vo
(74) *Attorney, Agent, or Firm* — Schemeiser, Olsen & Watts, LLP; Isaac Gooshaw

(57) ABSTRACT

A method and associated system. Entities within a first data source are identified. For each entity identified within the first data source, attributes of the entity identified within the first data source and/or relationships between the entity identified within the first data source and other entities identified within the first data source are identified. The attributes and/or relationships identified within the first data source are associated with a first entity identified within a data structure. For each entity identified within the first data source, a frequency metric characterizing the entity identified within the first data source is generated. The frequency metric is based on a frequency at which each attribute and/or relationship identified within the first data source is associated with the entity identified within the first data source. A degree of similarity between two entities of the entities is identified, by comparing the frequency metrics of the two entities.

22 Claims, 8 Drawing Sheets

(56) References Cited

U.S. PATENT DOCUMENTS

2015/0120679 A1     4/2015    Boreau et al.
2015/0248440 A1*   9/2015    Takayama ............. G06F 16/285
                                                                         707/737

OTHER PUBLICATIONS

Aug. 21, 2017—Mailing Date of Letter, PCT Article 19, 1 Page. Marked Up Claims, 6 Pages.

Andrei Iancu, "Remarks by Director Iancu at the Intellectual Property Owners Association 46th Annual Meeting", Sep. 24, 2018, Chicago,Illinois, retrieved on Nov. 18, 2018 from the Internet: 7 pages.

Jin et al., Sparse Lexical Representation for Semantic Entity Resolution978-1-4799-0356-6/13/$31.00 ©2013 IEEE 8575 ICASSP 2013, pp. 8575-8579.

Jonas et al., A Big Vision and a Journey Worth Being Part of, IBM® InfoSphere™ Sensemaking, p. 1 © IBM 2012 Version 1.11, 7 pages.

Wang et al., HAaaS: Towards Highly Available Distributed Systems, 2012 IEEE International Conference on Cluster Computing, 978-0-7695-4807-4/12 $26.00 © 2012 IEEE, DOI 10.1109/Cluster. 2012.59, pp. 618-621.

Record linkage—Wikipedia, the free encyclopedia https://en.wikipedia.org/wiki/Record_linkage, 9 pages, Feb. 4, 2016.

AlchemyAPI, an IBM Company, Text Analysis Features | AlchemyAPI http://www.alchemyapi.com/products/alchemylanguage, 2 pages, Feb. 4, 2016.

Hernandez, et al., IBM Research | Technical Paper Search | HIL: A High-Level Scripting L. . . http://domino.research.ibm.com/library/cyberdig.nsf/papers/F56284DE . . . , 1 page, 2012.

Entity Resolution for Big Data—Data Community DC http://www.datacommunitydc.org/blog/2013/08/entity-resolution-for-big . . . , Feb. 4, 2016, 19 pages.

Talburt et al., A Practical Guide to Entity Resolution with OYSTER, Handbook of Data Quality, Feb. 13, 2013, 4 pages.

Swoosh: a generic approach to entity resolution, CM DL Digital Library, 3 pages, Captured Aug. 28, 2015.

* cited by examiner

| Attribute REC ID | Unique Identifier |
|---|---|
| Attribute Type | Meaning of attribute, e.g. attribute is an address |
| Attribute Value | e.g. the address |
| Entity ID | The entity which the this attribute is associated with |
| Validation | As per entity table |
| Source | As per entity table |
| Confidence | As per entity table |

200

| Entity REC ID | Unique Identifier |
|---|---|
| Entity Type | e.g. organisation, person |
| Creation date | Date record generated |
| Validation | Permits human or algorithmic validation of record |
| Name | Name given to entity |
| Source | The data source – e.g. database or web page |
| Confidence | e.g. reliability of data source |
| Mapped entity ID | Another entity this entity is mapped to |
| Match confidence score | Confidence in candidate |
| Match proposed ID | Candidate entity for mapping |

100

| Relationship REC ID | Unique Identifier |
|---|---|
| Entity ID | ID of the "from" entity |
| From type | The from entity type |
| Relation to | ID of the "to" entity |
| To type | The to entity type |
| Source | As per entity table |
| Confidence | As per entity table |

| Source ID | Entity_Source | Match ID | Match_Entity | Similarity | Attributes |
|---|---|---|---|---|---|
| 1 | Ginni Smith | 102 | Ginni Smith | 8.04 | charity>organisation>memorial... |
| 1 | Ginni Smith | 125 | Ginni Smith | 6.58 | charity>organisation>memorial... |
| 1 | Ginni Smith | 2 | Ginni Smith | 6.45 | ceo>organisation>abc |
| 1 | Ginni Smith | 104 | Ginni Smith | 3.26 | ceo>organisation>abc |
| 2 | Ginni Smith | 104 | Ginni Smith | 11.36 | ceo>organisation>abc |
| 2 | Ginni Smith | 102 | Ginni Smith | 10.35 | Investor>organisation>abc |
| 2 | Ginni Smith | 125 | Ginni Smith | 8.47 | Investor>organisation>abc |
| 2 | Ginni Smith | 1 | Ginni Smith | 6.45 | ceo>organisation>abc |
| 2 | Ginni Smith | 93 | Ginni Smith | 2.73 | Investor>organisation>abc |
| 3 | Virginia Smith | 103 | Virginia Smith | 8.38 | ceo>organisation>abc |
| 3 | Virginia Smith | 98 | Virginia Smith | 6.34 | ceo>organisation>abc |
| 4 | Roger Jones | 9 | Roger | 2.98 | charity>organisation>unicef>tennis |
| 5 | Roger Jones | 42 | Roger Jones | 15.89 | switzerland |
| 5 | Roger Jones | 72 | Roger Jones | 12.19 | switzerland |
| 5 | Roger Jones | 41 | Roger Jones | 8.15 | switzerland |
| 5 | Roger Jones | 9 | Roger Jones | 4.11 | wife>person>mirka |

Figure 5

| Source ID | Entity_Source | Match ID | Match_Entity | Similarity | Attributes |
|---|---|---|---|---|---|
| 1 | Ginni Smith | 81 | Sam Doe | 32.18 | ceo>organisation>abc |
| x | xxx | x | xxx | x | xxx |
| x | xxx | x | xxx | x | xxx |
| 61 | Andy West | 4 | Roger Jones | 2.28 | tennis |
| 61 | Andy West | 70 | Jimson | 1.29 | tennis |
| 70 | Jimson | 4 | Roger Jones | 1.75 | tennis |
| 70 | Jimson | 61 | Andy West | 1.29 | tennis |
| x | xxx | x | xxx | x | xxx |

Figure 6

DATA PROCESSING

TECHNICAL FIELD

The present invention relates to a data processing apparatus and method for organizing data.

BACKGROUND

There are a number of well documented challenges relating to resolving entities mentioned in multiple documents and collapsing the documents based solely on entity, attributes and relationships extracted by most text analytics pipelines (for example Stanford Parser). Facts extracted from the documents are typically sparse (i.e., very few facts) and fuzzy (e.g., natural language can be ambiguous), or difficult to associate to a specific entity in a document. The more entities there are in the document, the more complicated it is to associate the sparse facts to a correct entity.

SUMMARY

The present invention provides a method, and associated computer system and computer program product. One or more processors of a computer system identify at least two entities within a first data source. For each entity identified within the first data source, the one or more processors: (i) identify within the first data source attributes of the entity identified within the first data source and/or relationships between the entity identified within the first data source and other entities identified within the first data source; and (ii) associate the attributes and/or relationships identified within the first data source with a first entity identified within a data structure. The one or more processors generate, for each entity identified within the first data source, a frequency metric characterizing the entity identified within the first data source. The frequency metric is based on a frequency at which each attribute and/or relationship identified within the first data source is associated with the entity identified within the first data source and in relation to frequencies of all other entities. The one or more processors identify a degree of similarity between two entities of the at least two entities by comparing the respective frequency metrics of the two entities.

BRIEF DESCRIPTION OF THE DRAWINGS

FIG. 3 schematically illustrates a set of tables for representing entities, attributes and relationships, in accordance with embodiments of the present invention.

FIG. 5 schematically illustrates an example outcome of analysis steps of FIG. 4, in accordance with embodiments of the present invention.

FIG. 6 schematically illustrates another example outcome of analysis steps of FIG. 4, in accordance with embodiments of the present invention.

DETAILED DESCRIPTION

Current algorithms for resolving entities require type schemas, complex ontologies and/or complex rules resolution. There are a number of issues with the current algorithms. Firstly, it is not always possible to define a schema of entities and attributes in advance (that is, before processing the data). One reason that it is not always possible to define a schema of entities and attributes in advance is that writing Annotation Query Language (AQL) rules (or any other static rules) to extract all attributes from all text documents is too expensive in skills and development time. A Natural Language Processing (NLP) parser (e.g., Stanford parser, Action Application Programming Interface (Action API), Natural Language Toolkit (NLTK), English Slot Grammar (ESG) parser or equivalent) can be used instead (of defining a schema of entities and attributes in advance) to help create entities and attributes that are not pre-canned, without needing to understand the meaning or context of the text being parsed. This means that an entity resolution capability may adapt to new "things" extracted from text to build an entity model on the fly. Most of the existing tools for entity resolution require a schema to be pre-defined. Secondly, sparsity of the extracted data means that the schema of an entity is not always complete. It is however still possible to match with some confidence on a partial schema/graph as long as there is sufficient evidence. An entity resolution model may need to be initially or continually trained by business users (who understand the data being modelled) or from ground truth from existing enterprise systems. Thirdly, it is not always possible to define the algorithm in advance, and the algorithm may not stay the same during the lifetime of the project. In particular, an algorithm should adapt to the "topology" of the entity model within the business context, rather than being set up in advance. To do this, a human often determines and indicates what fits and what doesn't fit in the current relevant business context and to provide any extra information required to help the algorithm.

Figure 1:
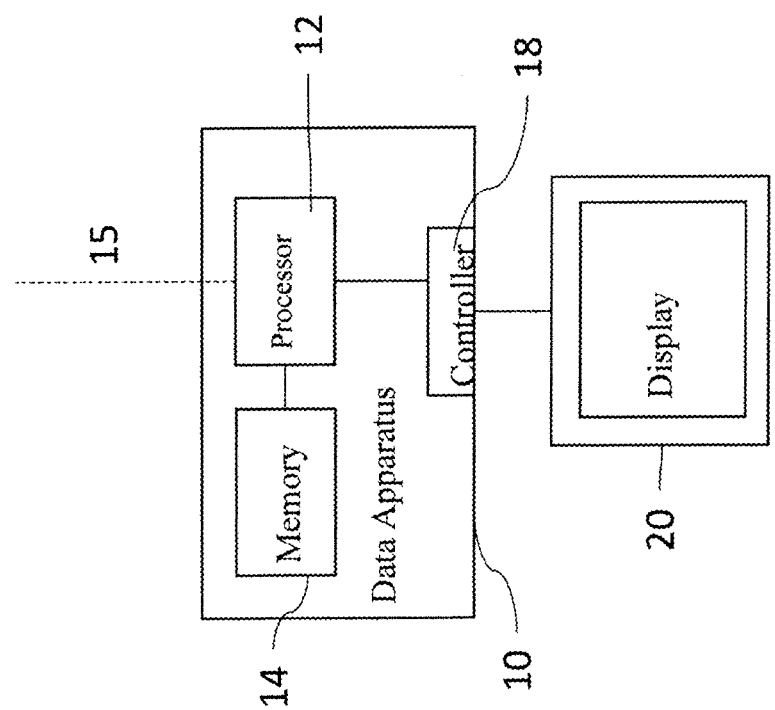
FIG. 1 schematically illustrates a data processing apparatus which may be connected to the Internet, in accordance with embodiments of the present invention.

FIG. 1 schematically illustrates a data processing apparatus which may be connected to the Internet, in accordance with embodiments of the present invention.

With reference to FIG. 1, a data processing apparatus 10 includes a processor 12, a memory 14 and a display controller 18. The data processing apparatus 10 is connected to an external display 20 via the display controller 18. The data processing apparatus 10 has a connection 15 to the Internet (not shown), via which the data processing apparatus 10 is able to access websites, databases and other documents, which can be accessed in a manner described infra. However, techniques of the present invention can also be applied to a device which is not connected to the Internet and can function equally well on documents located on a disk drive (such as from a content management system). In practice, it is possible that techniques of the present invention would be used in a hybrid mode in which documents from the Internet and local storage are both accessed. In any case, the accessed documents, and any data generated by access of the documents and any subsequent processing of the accessed documents can be stored in the memory 14. It will be appreciated that other components may be present, but need not be described here since the other components may be of conventional nature and are not helpful in explaining the operation of the present technique. In one embodiment, the data processing apparatus 10 is encompassed by the computer system 90 in FIG. 9, described infra.

Figure 2:
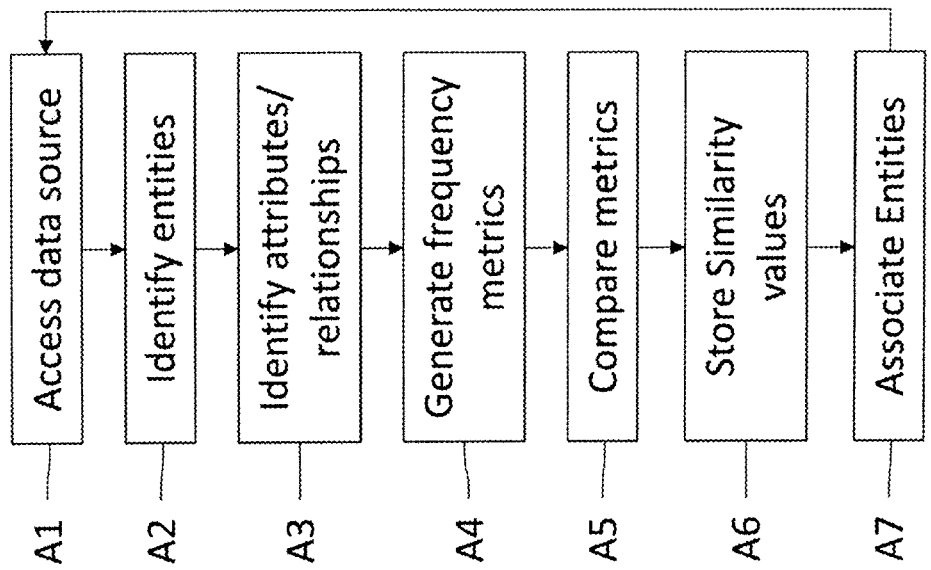
FIG. 2 is a schematic high level flow diagram of a method of organizing data, in accordance with embodiments of the present invention.

FIG. 2 is a schematic high level flow diagram of a method of organizing data, in accordance with embodiments of the present invention.

With reference to FIG. 2, at step A1, one or more data sources are accessed by the data processing apparatus 10. In one embodiment, each data source may independently be a single web page, a web site (which may contain multiple web pages), a database, or a text-based document. At step A2, a set of entities is identified from the one or more data sources, and stored in a data structure. In the case of the data structure being a database (e.g., DB2, ORACLE) or pre-resolved entities from trusted data sources (e.g., DBPedia, Wikipedia, WorldNet or Freebase), the data therein may be readily structured in a manner which supports entity identification. In the case of the data structure being web pages or other text based data sources, the entities may be identified using known natural language processing techniques. In the alternative, the entities may be specified in advance by a user. At step A3, attributes of the identified entities, or relationships between entities, are identified, and are stored in the data structure in association with the entities. In the case of a database, such attributes and/or relationships may be readily obtainable from the structure of the database and the information stored therein. In the case of text based data sources, the attributes and/or relationships of the entities may be extracted using known natural language processing techniques. At step A4, a frequency metric is generated for each entity, and is stored in the data structure in association with the entities, attributes and relationships. The frequency metric may also be generated or calculated in relation to the overall corpus of entities. The frequency metric characterizes the entity and is based on a frequency at which each attribute and/or relationship is associated with the entity in each data source and in relation to other entities. At step A5, the respective frequency metrics of a pair of entities are compared, and a similarity index for the pair is stored in the data structure in association with the entities, attributes and relationships at step A6. At step A7, entities which are sufficiently similar based on step A5 may be associated together at step A7. This association may be carried out provisionally in step A7 by the algorithm, to be subsequently confirmed by the user, if the similarity score exceeds a first predetermined threshold. The association may be carried out automatically by the algorithm (with no requirement for user confirmation), if the similarity score exceeds a second (higher) predetermined threshold.

The nature of the entities, attributes and relationships depends on context, and may depend on the content of the data sources in one embodiment. Where entities are provided by the user, the nature of the entities, attributes and relationships may take into account the context of the data sources for increasing confidence. Where entities are extracted by natural language processing, the algorithms are neutral as to the meaning of the underlying data. Entities may, for example, be people, organizations, countries or objects. Attributes of entities may depend on context. Where the entity is a person, attributes might include the person's nationality, job or interests. Where the entity is a company, attributes might include the location of the company, the industry the company operates in, and the company's turnover. Relationships between entities represent the fact that multiple entities may be related in some way. For example, if one entity is person, another entity is a company, and the person is the owner of the company, then a relationship can be defined between the two entities in that the second entity (i.e., company) is "owned by" the first entity (i.e., person).

FIG. 3 schematically illustrates a set of tables for representing entities, attributes and relationships, in accordance with embodiments of the present invention.

Referring to FIG. 3, an example schema for implementing a data structure for storing entities, attributes of those entities and relationships between entities is shown. In this example, an entity table 100, an attribute table 200 and a relationship table 300 are provided.

The entity table 100 includes the following fields:
an entity record identifier (ID), which is a unique identifier for the entity record;
an entity type, which indicates the type of the entity; for the type of the entity being a person or a company, this field may be used to filter results, or represents an attribute of the entity;
a creation date, which is the date the entity record for the entity was created;
a validation field, which can be populated to indicate that the entity record has been manually or algorithmically validated;
a name field indicating a name or label given to the entity; in one embodiment, the name of an entity can be considered a form of attribute of that entity, or in some cases (as will be described infra) matching may only take place in relation to entities having a same name, or a similar name;
a source field, indicating the data source from which the entity record has been populated;
a confidence field, indicating a measure of reliability of the data source from which the entity data was obtained, which could be used to weight the attributes or relationships associated with this entity, with more reliable data sources having a higher confidence and being given a greater weighting in one embodiment;
a mapped entity ID, indicating another entity to which this entity has been mapped indicating that this entity and the other entity relate to a same underlying subject;
a match proposed ID, indicating another entity to which this entity is being considered to be mapped;
a match confidence score, indicating a degree of confidence that this entity relates to the other entity indicated by the match proposed ID.

The attribute table 200 includes the following fields:
an attribute record ID, which is a unique identifier for the attribute record;
an attribute type, which indicates the type of the attribute—for example, the attribute type may be an address of the entity to which the attribute relates;
an attribute value, which is an instance or value of the attribute itself—for example, a text string of an address;
an entity ID, which indicates the entity which the attribute relates to;
a validation field—as per entity table 100;
a source field—as per entity table 100;
a confidence field—as per entity table 100.

The relationship table 300 includes the following fields:
a relationship record ID, which is a unique identifier for the relationship record;
an entity ID, which identifies a "from" entity;
a "from" type, indicating a "from" entity type;
a "relation to" field, which identifies a "to" entity;
a "to" type, indicating a "to" entity type;
a source field—as per entity table 100;
a confidence field—as per entity table 100.

The information in the entity table 100, attribute table 200 and relationship table 300 may not only be used to enable a similarity of entities to be assessed, but may also be used to filter information to be processed, or to weight the attributes/relationships.

Figure 4:
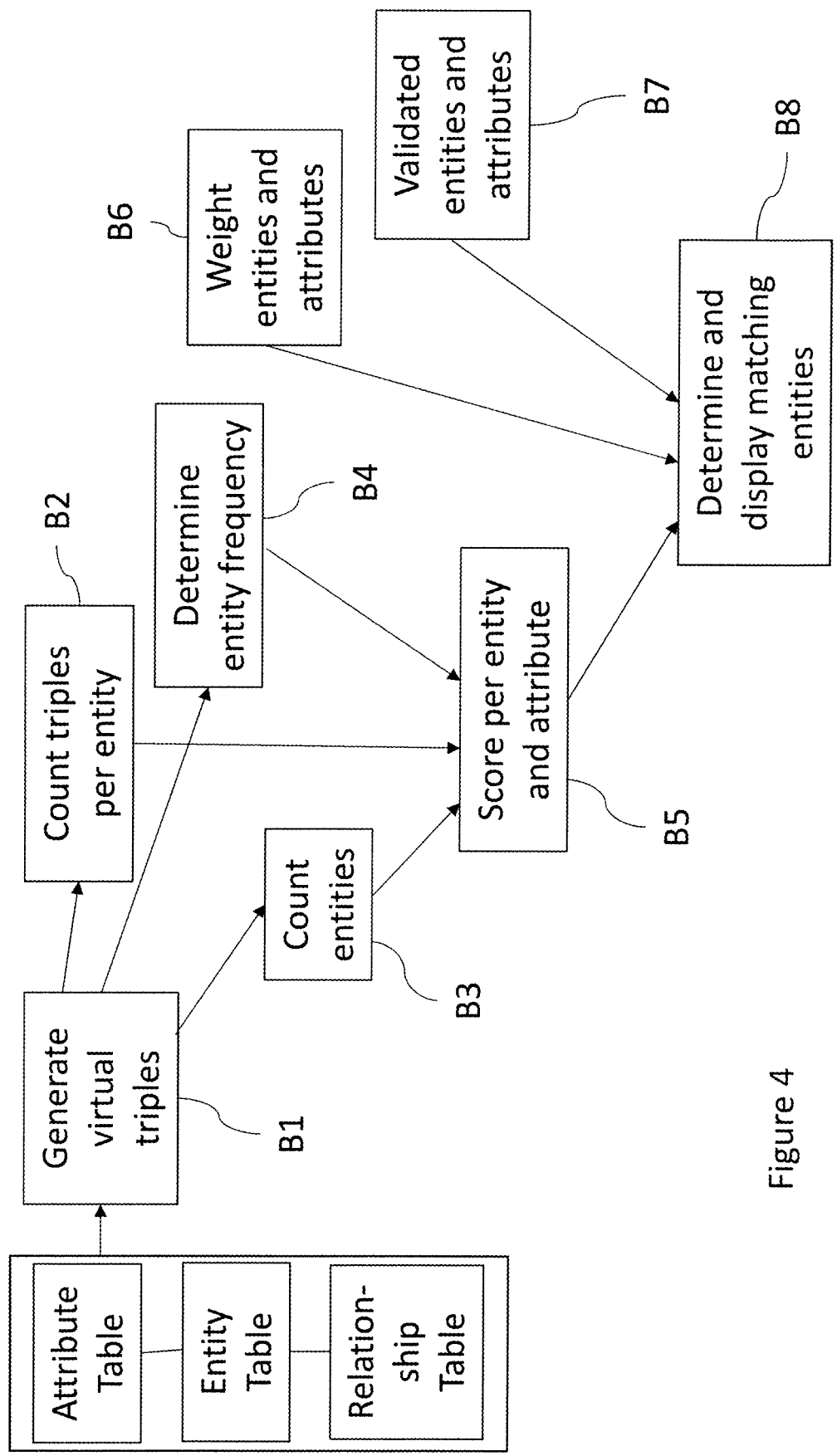
FIG. 4 is a schematic flow diagram of a method of analyzing and comparing entities, in accordance with embodiments of the present invention.

FIG. 4 is a schematic flow diagram of a method of analyzing and comparing entities, in accordance with embodiments of the present invention.

Referring to FIG. 4, steps A4 and A5 of FIG. 2 are described in more detail. The arrows in FIG. 4 represent the flow of data through the various steps of the method. In particular, at step B1, relationships between the entities and attributes or other entities may be extracted from tables 100, 200, and 300 of FIG. 3 and represented as virtual triples, each triples including a subject (the entity), a predicate (the relationship) and an object (the attribute, or other entity). In order to be scored for frequency, these triples may be formatted as text strings, with the text representing a combination of the predicate and object of the triple, and an entity ID representing the subject. Creation of the triples involves selecting, for a particular entity, one or more pieces of information about the entity which is represented in populated fields of one or a combination of the tables 100, 200 and 300. Examples may include that the entity has a "type" (predicate) of "organization" (object), has a "name" (predicate) of "European", or "married to" (predicate) another entity (object). The former two examples relate to attributes, and the latter example relates to a relationship (to another entity). However, both attributes and relationships may be represented in the same way in the text-based triple. It will be appreciated that an entity and its attributes and relationships can therefore be decomposed into, and represented by, a set of triples. Not all information in the tables need necessarily be extracted and used in this way. Only fields estimated to influence the outcome of the method of the present invention may be extracted and fields used for system management can be ignored.

At step B2, for each entity, a number of instances of each triple are determined by counting the instances of each triple for the data that is currently being processed and the number of instances of each triple are used to populate a first incrementable table. The number of instances of each triple could be determined in relation to the first access of a database table or as new sources of data are added. The data currently being processed could be a single document, a single table or multiples of documents and/or tables. The data of a CRM database could be parsed to a triple (as an example, this parsing could be done using the table name as a predicate, value as object and key as subject) and the frequency of that triple counted.

At step B3, the total number of discovered entities (NB_entities (ALL.ACNT)) in the data structure is counted. At step B4, two counts are made in relation to each of the triples. The first count (CNT_FREQ) is the frequency at which the predicate and object occurs across all entities. The second count (NB_ENTITY) takes into account how many different entities the combination of predicate and object belongs to; that is, the distinct number of entities, in the whole system, appearing with combinations of predicate and object in the triples. For example, the predicate-object 'is a'-'person' may appear more than once for an entity, but is only counted once as it is the number of entities that the predicate-object belongs to that is of interest for this second count. NB_ENTITY and CNT_FREQ form a second incrementable table since new triples extracted for new entities entering the system may be added or subtracted from the database tables.

At step B5, the entity/attribute (or relationship) pair is scored based on the following expression for Score (triple) which is a score for a given entity and a given triple pertaining to the given entity:

$$\text{Score(triple)} = \text{SUM(TF)} \times \text{SUM}(ABS(\text{LOG } 10(1.0 \times (\text{ALL}.ACNT)/(I.NB\_\text{ENTITY}))))$$

wherein:

SUM(TF)=count of number of instances of the given triple per entity, summed over the entities; TF denotes "term frequency" (from step B2)

ALL.ACNT=total number of discovered entities (from step B3)

I.NB_ENTITY=entity frequency of the predicate-object pair (i.e., count of number of entities of the predicate-object pair within the given triple), which causes a lower score for the entity/attribute (or relationship) pair if that pair appears in relation to many entities. "SUM" in SUM(ABS(LOG 10(1.0×(ALL.ACNT)/(I.NB_ENTITY)))) denotes a summation over the entities.

At step B6, business users are able to weight attributes/entities, based on an understanding by the business users of how significant a particular attribute or relationship is to a particular entity. Step B6 does not require the user to understand the algorithm, but rather to understand the data being processed by the algorithm. It will be appreciated that, in determining the similarity of two entities, higher weighted attributes and relationships will have a greater influence on the degree of similarity than lower weighted attributes and relationships. In this way, business users can give more weight to certain facts (e.g., entities, attributes, and/or relationships), in order to focus the algorithm to the business problem. By doing so, the algorithm can tailor the aggregation of facts within a specific business context linked to the business user, which is difficult to achieve with other algorithms.

At step B7, previously scored and validated entities/triples (that is, entities which have previously been subject to steps of B1 to B6) are looked up, and (weighted) attributes and relationship scores of the previously scored and validated entities/triples are identified. Then, at step B8, a SIM4 calculation of the newly scored entity (for example an entity A) with a stored entity (for example an entity B) is performed. SIM4 is an example of a suitable cosine distance computation which can be used to determine a degree of similarity between the frequency metrics of the two entities having common attributes/triples. It will be appreciated that other known similarity measures (cosine distance based or otherwise) could be used instead. A SIM4 calculation on matching triples can be evaluated as:

$$100 \times \frac{\Sigma((A.\text{SCORE} \times wgt) \times (B.\text{SCORE} \times wgt))}{\text{MIN}(SQRT(\Sigma(A.\text{SCORE})^2), (SQRT(\Sigma(B.\text{SCORE})^2))}$$

wherein A.SCORE represents scores evaluated for the entity A for common triples between entities A and B at step B5, B.SCORE represents scores evaluated for the entity B for common triples between entities A and B at step B5, and wgt represents a weighting (e.g., supplied by a business user) to the A.score and B.score. The summations (Σ) are over the common triples between entities A and B. MIN means "minimum of".

The preceding SIM4 calculation of cosine distance is well known by a person of ordinary skill in the art and is described in Kephart's paper (cited sipra) as follows as taken from the web address "http://www.research.ibm.com/people/r/rsegal/papers/dynlearn.pdf":

The weight vectors for each folder are used to classify each new message. When a message M arrives to be classified, it is first converted into a word-frequency vector F(M). Then, AIM computes the similarity between M and the weighted word-frequency vectors for each folder, W(F). AIM computes the similarity between the message vector and the weighted folder vectors using a variation of cosine distance called SIM4 (Salton & McGill, 1983):

$$SIM4(M, F) = \sum_{w \in M} F(M, w)W(F, w) \Big/ \min\left(\sum_{w \in M} F(M, w), \sum_{w \in M} W(F, w)\right)$$

Here the sums are taken only over the words that are contained with M. Finally, AIM takes the three folders with greatest similarity as its predictions.

Thus, the preceding SIM4 calculation is a cosine distance between entities A and B with respect to the triples that are common to the entities A and B. Each of the steps B1, B2, B3, B4, B5 and B8 generate an intermediate aggregate table which can be stored rather than discarded, such that the aggregate table does not need to be regenerated when next required.

FIG. 5 schematically illustrates an example outcome of analysis steps of FIG. 4, in accordance with embodiments of the present invention.

Referring to FIG. 5, a fragment of data is shown which shows entities which have been matched based on similarity using the method of FIG. 4, filtered to show only entities with the same names and attributes and types using a SIM4 measure distance with a threshold of greater than 1%. Further predicates could be readily added, for example to ensure that (normalized) entity names are similar. In FIG. 5, the column "Source ID" is a unique identifier for a first entity (for example entity A in the above description), "Entity_Source" is the name of the first entity, "Match ID" is a unique identifier for a second entity (for example entity B in the above description), "Match_Entity" is the name of the second entity, "Similarity" is the SIM4 similarly score determined between the first and second entities, and "A_Attributes" contains the attributes in common between the first and second entities, which have been scored. The similarity score can range from 0 (no attributes in common) to 100 (identical match). In FIG. 5, the top 11 entries in the data shown relate to a number of entities each having a name (which is an example of an attribute) of Ginni Smith (or similar—for example entries 10 and 11 relate to "Virginia Smith"). The first entity having the Source ID of 1 (top 4 rows) is associated with each of four entities having respective Match IDs of 102, 125, 2 and 104. The similarity is based on common attributes being present between the entity 1 and each of the entities 102, 125, 2, 104 in relation to the overall distributions of entities in the whole corpus of entities. Likewise, an entity having a Source ID of 3 is shown to be associated with two entities having Match IDs 103 and 98, again based on common attributes being present. An entity having an ID of 5 and a name "Roger Jones" is associated with four entities having Match IDs of 42, 72, 41 and 9 respectively. The first of these (having an ID of 5) has an identical name ("Roger Jones"), while the remaining three (having an ID of 5) are identically named to the entity having the ID of 5. Under the present algorithm and a very small subset of data, it can be recognized that records relating to "Ginni Smith" are associated with each other, and records relating to "Roger Jones" are associated with each other, based on a mix of identical names and similar attributes (e.g., the boxes labelled "A" and "B"). It can also be recognized that some records are being matched by the algorithm even with a partially matching name but enough attributes in common (the entity having an ID of 4).

Although the similarity between two entities has been presented supra as a SIM4 similarly score, the similarity between two entities, in the context of the present invention, may alternatively be any other variant of cosine score or any other measure of similarity generally.

FIG. 6 schematically illustrates another example outcome of analysis steps of FIG. 4, in accordance with embodiments of the present invention.

Referring to FIG. 6, a similar data extract to FIG. 5 is shown, but in FIG. 6, the matching is not restricted to entities having the same or similar names. In FIG. 6, Andy West, Jimson and Roger Jones each "play tennis" are thus considered to be similar type of entities because they "play tennis". Entities Ginni Smith and Sam Doe are considered to be similar as both held the position of CEO at an organization called abc. It can therefore be understood that the algorithms make it possible to automatically identify entities which are similar. The user can influence this process by modifying the weightings—for example, increasing the weighting applied to "tennis" would tend to result in entities having this attribute of "tennis" being considered more similar. In the interests of clarity, the rows of the table in FIG. 6 not relating to the above discussion are not shown in FIG. 6.

Figure 7:
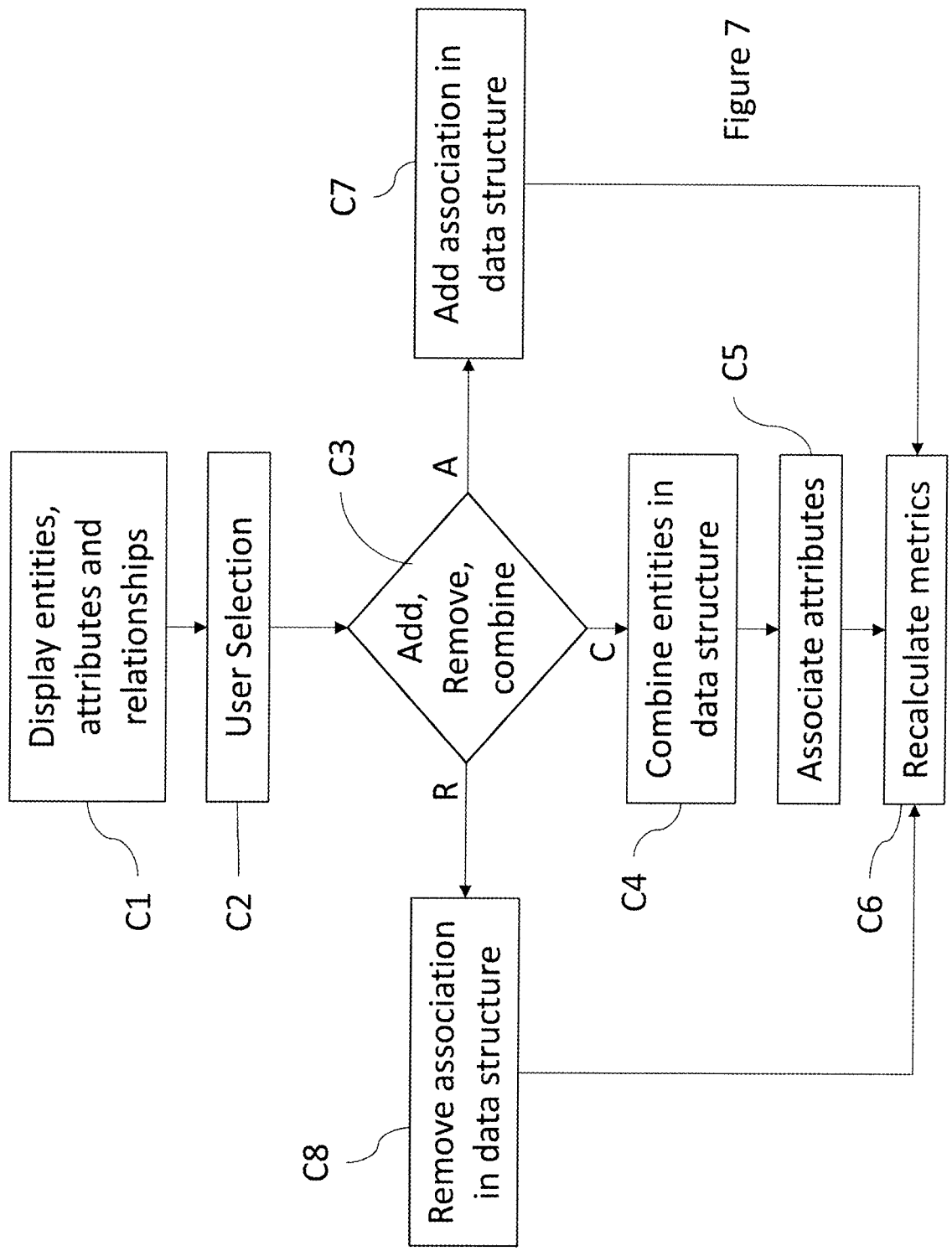
FIG. 7 is a schematic high level flow diagram of a method of providing a user with a facility to interact with organized data, in accordance with embodiments of the present invention.

FIG. 7 is a schematic high level flow diagram of a method of providing a user with a facility to interact with organized data, in accordance with embodiments of the present invention.

Referring to FIG. 7, the user is able to add an association between two entities (or confirm a provisional association made by the algorithm), remove an association between two entities (or remove a provisional association made by the algorithm), add or remove an association between an entity and an attribute, or combine two entities together where the user considers the two entities to relate to the same underlying subject. At step C1, data including entities, attributes of those entities, and relationships between those entities, are displayed to a user on the display 20. A user interface is provided to enable the user to interact with the data. For example, a user may be provided with the facility to manually input text data to be processed as a data source. At step C2, the user selects one or more elements of the data structure to modify. For example, the user may select an entity which is of no interest to be deleted from the data set, or may select two entities which are to be combined or associated with each other, or may select an attribute which is to be deleted, or associated or disassociated with an entity. At step C3, it is determined whether an operation to add or remove an association, or to combine two entities, has been selected by the user. If an operation to combine two entities together has been selected (C branch from step C3), then the two entities are combined within the data structure in step C4; for example, by populating the mapped entity ID field in the entity table 100 of FIG. 3. The user may have been prompted to confirm this combination based on the match proposed ID and match confidence score fields in the table 100 having been populated. As a result, at a step C5, the attributes of the two entities are effectively associated with each other. The metrics for these two entities are thus recalculated at a step C6. In this way, the user interaction to combine together two entities will have repercussions in the generation of frequency metrics and similarity scores for the combined entities and other entities within the data structure, which can be done without recalculating every score since the algorithm of the inventive method can be applied incrementally to only the entities that changed and to dependencies of the entities.

If at the step C3 it is determined that the user has selected to add an association (either between entities, or between an entity and an attribute) (A branch from step C3), then at a step C7 the association is added into the data structure. In the case of associating two entities together, this may involve generating a new relationship record (table 300) representing the user defined relationship between the two entities. In the case of associating an entity with an attribute, this may involve generating a new attribute record (table 200) representing the association of the attribute with the entity. In any case, following the association being added, metrics for the affected entities are recalculated at step C6.

If at the step C3 it is determined that the user has selected to remove an association (R branch from step C3), then at a step C8 the association is removed from the data structure. In the case of removing an association between two entities, this may involve deleting a relationship record (table 300) representing the relationship between the two entities. In the case of removing an association between an entity and an attribute, this may involve deleting an attribute record (table 200) representing the association of the attribute with the entity. In any case, following the association being deleted, metrics for the affected entities are recalculated at step C6.

Figure 8B:
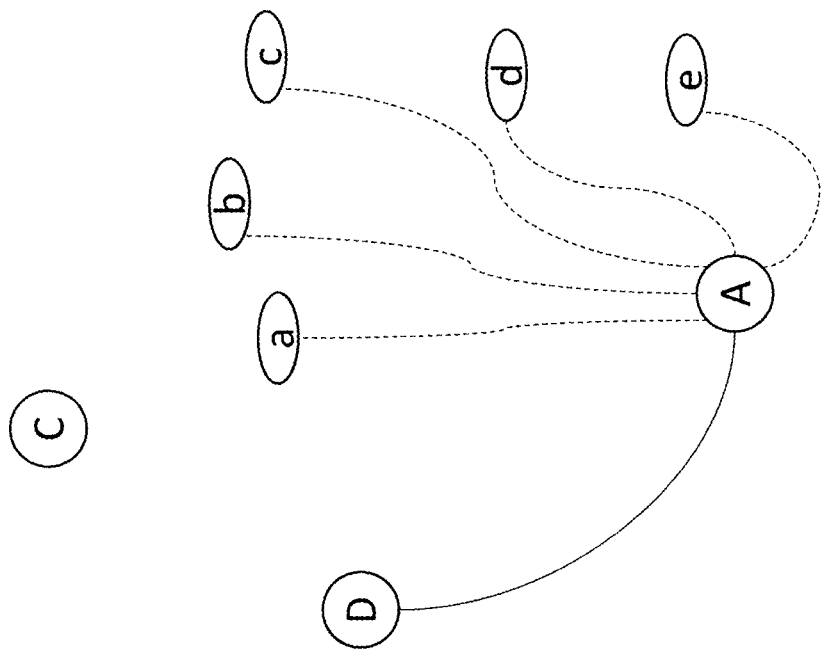
FIGS. 8A and 8B schematically illustrate visual representations of organized data, with FIGS. 8A and 8B respectively illustrating a before and after case of an operation to combine entities, in accordance with embodiments of the present invention.
Figure 8A:
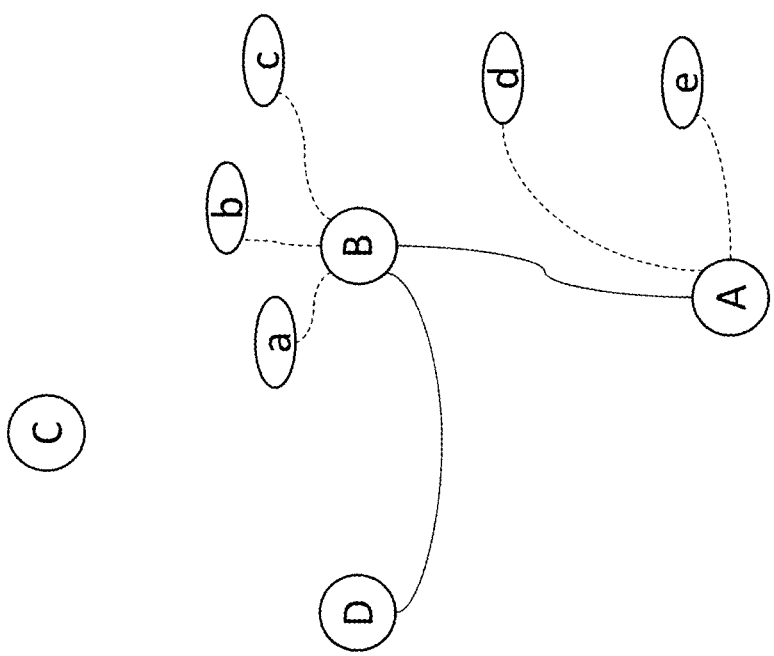

FIGS. 8A and 8B schematically illustrate visual representations of organized data, with FIGS. 8A and 8B respectively illustrating a before and after case of an operation to combine entities, in accordance with embodiments of the present invention.

Referring to FIGS. 8A and 8B, an illustrative visual representation of entities, attributes and relationships within the data structure is provided. Entities are represented by circles containing an upper case letter. In FIG. 8A, entities A, B, C and D are provided. Attributes are represented by ovals containing a lower case letter. In FIG. 8A, attributes a, b and c are shown to be associated within the entity B, while attributes d and e are shown to be associated with the entity A. Relationships between entities and attributes are shown with dashed connecting lines. Relationships between entities are shown with solid connecting lines. It can be seen in FIG. 8A that relationships are defined between entities A and B, and between entities B and D. FIG. 8B illustrates the effect of a user (or optionally the algorithm) combining together two entities. In particular, the entities A and B have been combined, with the result that the attributes of each of the entities A and B are now associated with each other. It will be appreciated that the visual display is much simplified as a result of this operation. It will be understood that a user can combine together entities in this way, or remove entities (such as the entity C, which appears to be unrelated to the entities of interest (A, B and D) to both improve the relevance of the data, and to make visualization more straightforward.

From the above discussions in relation to FIGS. 1 to 8A and 8B, it will be recognized that the algorithm does not require a detailed predetermined schema or type information, and is able to loosely associate entities together over time, building a clearer picture of entities as new facts are aggregated. Once there are enough facts common to multiple entities, the multiple entities can then be associated together with a confidence level. This association may be confirmed (trained) by business users such that the algorithm can identify or otherwise learn facts that are then associated with entities. The fact that predetermined typing is not required results in a reduced need for human guidance, for example a reduced need for an Information Technology (IT) personnel to be involved for configuring the matching. In some embodiments, only business users need to be involved, since the typical interactions of the business users with the data does not require the business users to have an understanding of how the data is being processed. Operations dependent on the data are automatic, based on updating the entity, attribute and relationship tables and recalculating frequency metrics and similarity scores accordingly (noting that intermediate aggregate tables are preserved so that the recalculations need not be conducted from the start).

The present technique leverages more entities, facts and attributes, extracted from a greater number of documents, to build a constantly changing but converging picture of all of these data snippets while accessing and aggregating the data snippets over time. The resulting facts lead to more cross-reference evidence building up over time, either reinforcing or degrading the strength of associations between entities and the attributes and relationships of the entities. This evidence can also be validated or discarded by human intervention. The entity resolution algorithm uses a modified TF-IDF algorithm that can incrementally associate sparse facts (as triples) to entities over time while providing linear Input/Output (I/O) and (Central Processing Unit (CPU) usage, and without requiring a predefined complex schema. The entity resolution algorithm can associate entities with very similar set of attributes and relationships together as more evidence is building up. The fact that the algorithm works with incremental new facts also means that the algorithm can scale out well on any platform, but most particularly on a big data platform where the number of facts extracted from text and documents can be very large.

The TF-IDF algorithm is a modified Automatic Information Metadata (AIM) (Barrett and Selker, 1995), which is originally a text classifier but modified to support incremental learning as described in the paper "Incremental Learning in Swiftfile" by Richard B. Segal and Jeffrey O. Kephart. (2000). In order to handle the triples representing the entity, attribute, relationship data, Swiftfile documents become entities, and words become attributes in the present implementation. For example, in contrast to the TF-IDF technique described in the above documents, in the present technique folders and documents become entities (for example individuals such as "Roger Jones" or "Ginni Smith"), while tokens become attributes and types (for example "car" (attribute), "possession" (type), "50 million" (attribute) or "net worth" (type)), or relationships ("Roger Jones", "Ginni Smith", "Roland Garros 2004"). The triple data is formatted in a specific way to calculate the TF-IDF score, with types and values being concatenated before a TF and IDF score can be calculated. In particular, a way to present the attributes and relationships to the TF-IDF algorithm may be the same. Therefore when multiple attributes values are required (such as relationship), these multiple attributes values are concatenated together with a separator (>character for instance) so that the multiple attributes values can be used as a text field only. Multiple columns could be used instead of multiple attributes values. In that way it is possible to feed simple single valued attributes and complex valued attributes in the same way to the algorithm. The resulting algorithm can associate entities together based on a common set of attributes and relationships of the entities and with a close enough name (for example measured by some string distance metric such as edit distance for instance), eventually adding synonyms resolution. The resulting algorithm can also be used to infer the profile of an entity in terms of attribute types and allow for an entity comparison based just on the profile types. Different distance measures may be used, taking into account stemming and/or edit distance.

To make the overall pipeline more efficient and converge faster, the present invention may integrate data cleansing, normalizing and synonym resolution (for example using worldnet or a business maintained synonym table) before performing the matching, as this integration helps to reduce the number of different attribute types and values (for instance using CEO for both CEO and Chief executive officer). However, even without a such a cleansing/normalization process, the present algorithm will still work as long as the business user keeps matching the entities manually: the algorithm will inherently learn from this matching activity over time, and can be primed with reference data if required and the business user will have less and less work do to match entities as the algorithm converges fairly quickly as shown in Kephart's paper cited supra.

The present technique provides for both incremental learning and batch-oriented learning and is able to learn and adapt from business user input at an entity or attribute level, and can add or remove entity to entity or entity to attribute associations incrementally. The only data model required is one linking entities, attributes and relationships with other entities.

Figure 9:
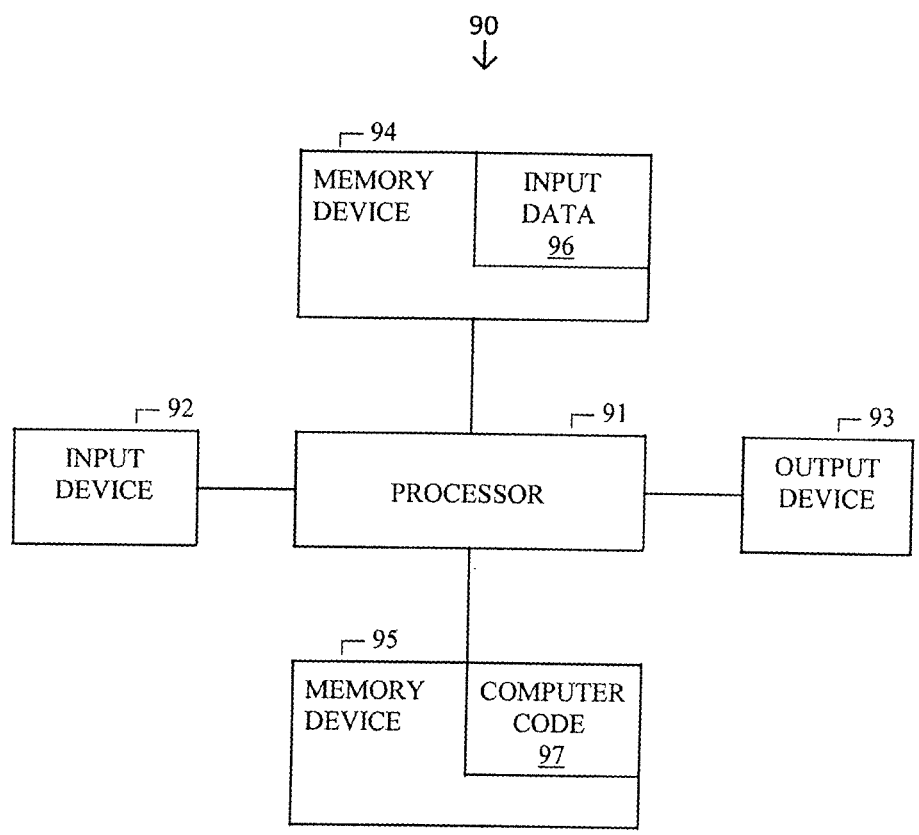
FIG. 9 illustrates a computer system used for performing methods of the present invention.

FIG. 9 illustrates a computer system 90 used for implementing the methods of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that includes computer-executable instructions. The computer code 97 includes software or program instructions that may implement an algorithm for implementing methods of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 9) may be used as a computer usable storage medium (or program storage device) having a computer readable program embodied therein and/or having other data stored therein, wherein the computer readable program includes the computer code 97. Generally, a computer program product (or, alternatively, an article of manufacture) of the computer system 90 may include the computer usable storage medium (or said program storage device).

The processor 91 may represent one or more processors. The memory device 94 and/or the memory device 95 may represent one or more computer readable hardware storage devices and/or one or more memories.

Thus the present invention discloses a process for supporting, deploying and/or integrating computer infrastructure, integrating, hosting, maintaining, and deploying computer-readable code into the computer system 90, wherein the code in combination with the computer system 90 is capable of implementing the methods of the present invention.

While FIG. 9 shows the computer system 90 as a particular configuration of hardware and software, any configuration of hardware and software, as would be known to a person of ordinary skill in the art, may be utilized for the purposes stated supra in conjunction with the particular computer system 90 of FIG. 9. For example, the memory devices 94 and 95 may be portions of a single memory device rather than separate memory devices.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, Firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention includes one or more computer readable hardware storage devices having computer readable program code stored therein, said program code containing instructions executable by one or more processors to implement the methods of the present invention.

A computer system of the present invention includes one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method, said method comprising:
   identifying, by one or more processors of a computer system, a plurality of entities within a first data source;
   for each entity identified within the first data source, said one or more processors identifying within the first data source attributes of the entity identified within the first data source and relationships between the entity identified within the first data source and other entities identified within the first data source, and associating the attributes and relationships identified within the first data source with a first entity identified within a data structure;
   said one or more processors generating, for each entity identified within the first data source, a frequency metric characterizing the entity identified within the first data source, said frequency metric based on a frequency at which each attribute and relationship identified within the first data source is associated with the entity identified within the first data source, said generating, for each entity identified within the first data source, the frequency metric characterizing the entity identified within the first data source comprising:
   generating multiple virtual triples for the entity identified within the first data source, each virtual triple consisting of a subject, a predicate, and an object, wherein the subject is the entity identified within the first data source, the predicate is the relationship identified within the first data source, and the object is the attribute identified within the first data source; and computing the frequency metric (Score (triple)) characterizing the entity identified within the first data source for each triple according to: Score (triple)= SUM(TF)×SUM(ABS(LOG 10(1.0×(ALL.ACNT)/(I.NB_ENTITY)))), wherein SUM(TF)=count of number of instances of the triple per entity identified within the first data source, summed over the entities, wherein ALL.ACNT=total number of entities within the first data source, and wherein I.NB_ENTITY=count of number of entities of a predicate-object pair within the each triple;

said one or more processors identifying a degree of similarity between two entities of the plurality of entities by comparing the respective frequency metrics of the two entities; and said one or more processors associating the two entities within the data structure in response to a determination that an identified degree of similarity between the two entities is greater than a first predetermined threshold.

2. The method of claim 1, said method comprising:
said one or more processors identifying one or more entities within a second data source;
for each entity identified in the second data source, said one or more processors identifying within the second data source attributes and relationships of the entity identified within the second data source, and associating the attributes and entities identified in the second data source with the first entity identified within the data structure;
generating, for each entity identified in the second data source, a frequency metric characterizing the entity identified in the second data source based on a frequency at which each attribute and relationship identified within the second data source is associated with the entity identified within the second data source;
wherein a degree of similarity between an entity in the first data source and an entity in the second data source is identified by comparing the respective frequency metrics of the two entities.

3. The method according to claim 1, wherein the frequency metric characterizing the entity identified within the first data source represents a degree of association between the entity identified within the first data source and the attributes and relationships identified within the first data source.

4. The method of claim 1, wherein said identifying the degree of similarity between the two entities comprises using a cosine distance computation between the respective frequency metrics of the two entities.

5. The method of claim 1, wherein said identifying the plurality of entities within the first data source comprises defining a set of entities to be searched for in the first data source.

6. The method of claim 1, wherein said identifying attributes of an entity identified within the first data source comprises decomposing text of the first data source into an entity, relationship and attribute triple, wherein the relationship is the relationship between the entity identified within the first data source and the attribute, or between the entity identified within the first data source and another entity identified within the first data source.

7. The method of claim 1, said method comprising:
said one or more processors providing a facility for a user to confirm an association between the two entities, or between an entity identified within the first data source and an attribute identified within the first data source.

8. The method of claim 1, said method comprising:
said one or more processors providing a facility for a user to remove an association between the two entities, or between an entity identified within the first data source and an attribute of the entity identified within the first data source.

9. The method of claim 1, said method comprising:
said one or more processors providing a facility for a user to manually associate an attribute with an entity identified within the first data source.

10. The method of claim 1, said method comprising:
said one or more processors providing a facility for a user to combine the two entities together in the data structure, wherein attributes of both entities of the two entities are associated with the combined two entities in the data structure.

11. The method of claim 10, said method comprising:
said one or more processors calculating a frequency metric for the combined two entities based on a frequency at which each attribute of the combined two entities is associated with the combined two entities.

12. The method of claim 1, said method comprising:
said one or more processors combining the two entities into a single entity in response to a determination that an identified degree of similarity between the two entities is greater than a second predetermined threshold.

13. The method of claim 1, said method comprising:
said one or more processors associating the two entities with each other in response to a determination that an identified degree of similarity between the two entities is greater than a second predetermined threshold and the two entities have a same entity name or a similar entity name.

14. The method of claim 1, wherein the said identifying entities within the first data source comprises including the first data source within a natural language algorithm.

15. The method of claim 1, said method comprising:
said one or more processors displaying a representation of the data structure to identify to a user associations between entities within the data structure.

16. The method of claim 15, wherein the associations between entities within the data structure are displayed in response to a determination that the degree of similarity between the two entities is greater than a third predetermined threshold.

17. The method of claim 15, wherein the representation of the data structure identifies to the user associations between the entities within the data structure and attributes of the entities within the data structure.

18. The method of claim 1, said method comprising:
said one or more processors providing a facility for a user to manually input text data to be processed as another data source.

19. The method of claim 1, said method comprising:
said one or more processors providing a facility for the user to apply a weighting to a first attribute of an entity identified within the first data source to influence the impact of that the first attribute on the frequency metrics characterizing the entity identified within the first data source.

20. The method of claim 1, wherein the first data source is a web page or document.

21. A computer program product, comprising one or more computer readable hardware storage devices having computer readable program code stored therein, said program code containing instructions executable by one or more processors of a computer system to implement a method, said method comprising:

said one or more processors identifying a plurality of entities within a first data source;

for each entity identified within the first data source, said one or more processors identifying within the first data source attributes of the entity identified within the first data source and relationships between the entity identified within the first data source and other entities identified within the first data source, and associating the attributes and relationships identified within the first data source with a first entity identified within a data structure;

said one or more processors generating, for each entity identified within the first data source, a frequency metric characterizing the entity identified within the first data source, said frequency metric based on a frequency at which each attribute and relationship identified within the first data source is associated with the entity identified within the first data source, said generating, for each entity identified within the first data source, the frequency metric characterizing the entity identified within the first data source comprising:

generating multiple virtual triples for the entity identified within the first data source, each virtual triple consisting of a subject, a predicate, and an object, wherein the subject is the entity identified within the first data source, the predicate is the relationship identified within the first data source, and the object is the attribute identified within the first data source; and computing the frequency metric (Score (triple)) characterizing the entity identified within the first data source for each triple according to: Score (triple)=SUM(TF)×SUM(ABS(LOG 10(1.0×(ALL.ACNT)/(I.NB_ENTITY)))), wherein SUM(TF)=count of number of instances of the triple per entity identified within the first data source, summed over the entities, wherein ALL.ACNT=total number of entities within the first data source, and wherein I.NB_ENTITY=count of number of entities of a predicate-object pair within the each triple;

said one or more processors identifying a degree of similarity between two entities of the plurality of entities by comparing the respective frequency metrics of the two entities; and said one or more processors associating the two entities within the data structure in response to a determination that an identified degree of similarity between the two entities is greater than a first predetermined threshold.

22. A computer system, comprising one or more processors, one or more memories, and one or more computer readable hardware storage devices, said one or more hardware storage device containing program code executable by the one or more processors via the one or more memories to implement a method, said method comprising:

said one or more processors identifying a plurality of entities within a first data source;

for each entity identified within the first data source, said one or more processors identifying within the first data source attributes of the entity identified within the first data source and relationships between the entity identified within the first data source and other entities identified within the first data source, and associating the attributes and relationships identified within the first data source with a first entity identified within a data structure;

said one or more processors generating, for each entity identified within the first data source, a frequency metric characterizing the entity identified within the first data source, said frequency metric based on a frequency at which each attribute and relationship identified within the first data source is associated with the entity identified within the first data source, said generating, for each entity identified within the first data source, the frequency metric characterizing the entity identified within the first data source comprising:

generating multiple virtual triples for the entity identified within the first data source, each virtual triple consisting of a subject, a predicate, and an object, wherein the subject is the entity identified within the first data source, the predicate is the relationship identified within the first data source, and the object is the attribute identified within the first data source; and computing the frequency metric (Score (triple)) characterizing the entity identified within the first data source for each triple according to: Score (triple)=SUM(TF)×SUM(ABS(LOG 10(1.0×(ALL.ACNT)/(I.NB_ENTITY)))), wherein SUM(TF)=count of number of instances of the triple per entity identified within the first data source, summed over the entities, wherein ALL.ACNT=total number of entities within the first data source, and wherein I.NB_ENTITY=count of number of entities of a predicate-object pair within the each triple;

said one or more processors identifying a degree of similarity between two entities of the plurality of entities by comparing the respective frequency metrics of the two entities; and said one or more processors associating the two entities within the data structure in response to a determination that an identified degree of similarity between the two entities is greater than a first predetermined threshold.

* * * * *